Figures 1, 2:
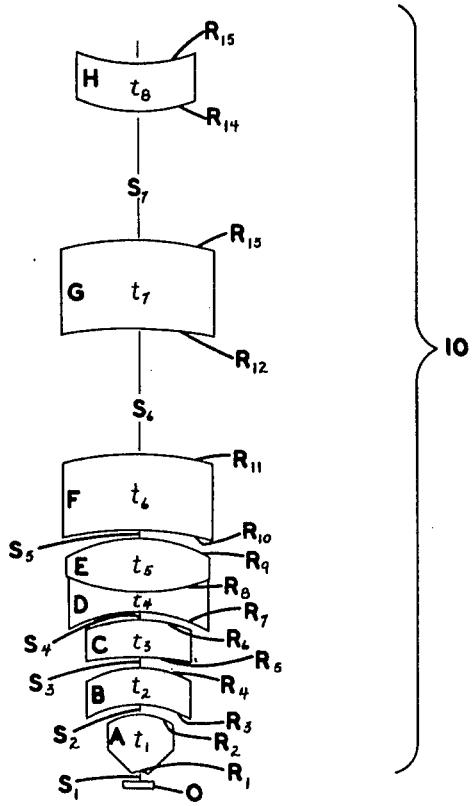

| E.F. = 0.206 | | N.A. = 0.65 | | MAGNIFICATION = 40X | | |
|---|---|---|---|---|---|---|
| LENS | RADII | THICKN'S | SPACES | F' | $n_D$ | $\nu$ |
| A | $R_1 = -\ .081$<br>$R_2 = -\ .123$ | $t_1 = .122$ | $S_1 = .017$ | 3.425 | 1.620 | 60.3 |
| B | $R_3 = -\ .248$<br>$R_4 = -\ .172$ | $t_2 = .079$ | $S_2 = .004$ | 0.645 | 1.620 | 60.3 |
| C | $R_5 = -2.530$<br>$R_6 = -\ .310$ | $t_3 = .087$ | $S_3 = .004$ | 0.564 | 1.617 | 54.9 |
| D | $R_7 = -\ .379$ | $t_4 = .047$ | $S_4 = .004$ | −0.246 | 1.751 | 27.8 |
| E | $R_8 = +\ .379$<br>$R_9 = -\ .379$ | $t_5 = .118$ | | 0.325 | 1.620 | 60.3 |
| F | $R_{10} = -1.026$<br>$R_{11} = -\ .624$ | $t_6 = .177$ | $S_5 = .012$ | 2.209 | 1.617 | 54.9 |
| G | $R_{12} = -1.884$<br>$R_{13} = -1.026$ | $t_7 = .193$ | $S_6 = .260$ | 2.074 | 1.621 | 36.2 |
| H | $R_{14} = +\ .373$<br>$R_{15} = +\ .288$ | $t_8 = .091$ | $S_7 = .272$ | −34.67 | 1.617 | 54.9 |

SCALAR QUANTITIES IN INCHES

*INVENTOR.*
PAUL L. RUBEN
BY Frank C. Parker
ATTORNEY

United States Patent Office 3,102,158
Patented Aug. 27, 1963

3,102,158
MICROSCOPE OBJECTIVE
Paul L. Ruben, Rochester, N.Y., assignor to Bausch & Lomb Incorporated, Rochester, N.Y., a corporation of New York
Filed Aug. 25, 1961, Ser. No. 133,819
4 Claims. (Cl. 88—57)

This invention relates to an optical system for microscope objectives and kindred devices and more particularly it relates to improvements in microscope objectives in the medium power range.

It is an object of this invention to provide an optical design for microscope objectives of about 40× and at least 0.65 numerical aperture, said objective being corrected for all image aberrations to a superior degree so as to provide an image of at least 20 mm. in the eyepiece focal plane which is diffraction limited, said design being such as to enable said objective to transmit a minimum of 60% of the reflective meridional ray fan at the edge of the field.

It is a further object of this invention to provide such a device by the simplest feasible means which is consistent with economical manufacture and high performance.

Further objects and advantages of this invention will be found in the details of construction and arrangement of parts therein by reference to the specification herebelow taken together with the accompanying drawing, in which:

FIG. 1 is an optical diagram showing a preferred form of the present invention; and FIG. 2 is a chart giving the constructional data related to the optical system shown in FIG. 1.

The optical system, shown in FIG. 1, is generally designated by the number 10, and is particularly designed for use in metallurgical types of microscopes, said system comprising a succession of eight lens elements designated by the letters A to H which are optically aligned to form an image of an object O at the eyepiece focal plane of the instrument.

According to this invention, six meniscus lenses A, B, C, DE, F and G are located serially nearest to and concave to the object O, wherein lens elements A, B, C, F and G are of positive power, the lens elements D and E having negative and positive power respectively and being combined into a doublet DE having net negative power. The rearmost element H is a negative meniscus lens which is concave toward the rear. For satisfactorily achieving the objects of this invention, the focal lengths of said lens elements, designated $F_A'$ to $F_H'$, and their respective axial thicknesses $t_1$ to $t_8$ should have numerical values as given in the table herebelow wherein $f$ denotes the equivalent focus of the optical system.

$15.0f < F_A' < 18.0f$
$2.8f < F_B' < 3.4f$
$2.4f < F_C' < 2.9f$
$1.07f < -F_D' < 1.26f$
$1.4f < F_E' < 1.7f$
$1.0f < F_F' < 1.2f$
$.88f < F_G' < 1.06f$
$1.5f < -F_H' < 1.8f$
$.53f < t_1 < .65f$
$.34f < t_2 < .42f$
$.38f < t_3 < .45f$
$.20f < t_4 < .25f$
$.52f < t_5 < .63f$
$.78f < t_6 < .94f$
$.85f < t_7 < 1.03f$
$.39f < t_8 < .49f$

Furthermore, the axial air spaces $S_1$ to $S_7$ as shown on the drawing and the refractive index $n_D$ and Abbe number $\nu$ of the lens material should have numerical values lying within ranges specified therefor in the table herebelow.

$.074f < S_1 < .091f$
$.018f < S_2 < .021f$
$.018f < S_3 < .021F$
$.018f < S_4 < .021f$
$.053f < S_5 < .064f$
$1.13f < S_6 < 1.39f$
$1.19f < S_7 < 1.45f$ $1.615 < n_D(A) < 1.625$
$1.615 < n_D(B) < 1.622$
$1.612 < n_D(C) < 1.622$
$1.740 < n_D(D) < 1.760$
$1.615 < n_D(E) < 1.625$
$1.612 < n_D(F) < 1.622$
$1.616 < n_D(G) < 1.626$
$1.612 < n_D(H) < 1.622$ $58.0 < \nu(A) < 62.0$
$58.0 < \nu(B) < 62.0$
$52.0 < \nu(C) < 57.0$
$25.0 < \nu(D) < 30.0$
$58.0 < \nu(E) < 62.0$
$52.0 < \nu(F) < 57.0$
$34.0 < \nu(G) < 38.0$
$52.0 < \nu(H) < 57.0$

Stated in a more specific and restricted manner, said refractive indices and their matching Abbe numbers are related according to the mathematical statements herebelow.

$n_D(A) = n_D(B) = n_D(E) = > 1.615$
$n_D(C) = n_D(F) = n_D(H) \leq n_D(A)$
$n_D(D) = [n_D(A) + \text{at least } .13]$
$\nu(A) = \nu(B) = \nu(E) = < 61.0$
$\nu(C) = \nu(F) = \nu(H) = [\nu(A) - \text{at least } 5.0]$
$\nu(D) = [\nu(A) - \text{at least } 32.0]$
$\nu(G) = [\nu(A) - \text{at least } 24.0]$ Generally the radius of curvature of the refractive lens surfaces $R_1$ to $R_{15}$ as shown on the drawing should lie within the range of values given herebelow, the sign of the surfaces which are concave toward the front being designated with a minus sign.

$.35f < -R_1 < .43f$
$.54f < -R_2 < .66f$
$1.09f < -R_3 < 1.32f$
$.75f < -R_4 < .92f$
$11.0f < -R_5 < 13.5f$
$1.36f < -R_6 < 1.6f$
$1.6f < -R_7 < 1.97f$
$1.6f < +R_8 < 1.97f$
$1.6f < -R_9 < 1.97f$
$4.48f < -R_{10} < 5.47f$
$2.72f < -R_{11} < 3.32f$
$8.23f < -R_{12} < 10.05f$
$4.48f < -R_{13} < 5.47f$
$1.63f < +R_{14} < 1.99f$
$1.25f < +R_{15} < 1.54f$

The best relationship of the various lens radii of curvature in the preferred form of this invention are stated in the table herebelow.

$$-R_2 = -1.52R_1$$
$$-R_4 = -.69R_3$$
$$-R_6 = -.122R_5$$
$$-R_7 = -R_9 = +R_8$$
$$-R_{11} = -.606R_{10}$$
$$-R_{13} = -.544R_{12}$$
$$+R_{15} = +.77R_{14}$$

Within the above-stated ranges of numerical values of lens constructional data, the table given herebelow describes one specific form of microscope objective wherein all of the objects of this invention are fulfilled. In the table, letters A to H designate the individual lens elements, E.F. and N.A. denote the equivalent focus and numerical aperture respectively of the objective, $R_1$ to $R_{15}$ designate the radii of the refractive surfaces, those surfaces which diverge image rays coming from the front being designated by a minus sign, $t_1$ to $t_8$ represent the lens thicknesses, $S_1$ to $S_7$ represent the air spaces surrounding the lens elements, F.L. denotes the focal length of the individual elements, and $n_D$ and $\mu$ represent the refractive index and Abbe number respectively of said elements.

[E.F.=0.206.   N.A.=0.65.   Magnification=40X]

| Lens | Radii | Thicknesses | Spacings | F.L. | $n_D$ | $\nu$ |
|---|---|---|---|---|---|---|
| | | | $S_1$=.017 | | | |
| A | $R_1$ = −.081 | $t_1$=.122 | | 3.425 | 1.620 | 60.3 |
| | $R_2$ = −.123 | | $S_2$=.004 | | | |
| B | $R_3$ = −.248 | $t_2$=.079 | | 0.645 | 1.620 | 60.3 |
| | $R_4$ = −.172 | | $S_3$=.004 | | | |
| C | $R_5$ = −2.530 | $t_3$=.087 | | 0.564 | 1.617 | 54.9 |
| | $R_6$ = −.310 | | $S_4$=.004 | | | |
| D | $R_7$ = −.379 | $t_4$=.047 | | −0.246 | 1.751 | 27.8 |
| E | $R_8$ = +.379 | $t_5$=.118 | | 0.325 | 1.620 | 60.3 |
| | $R_9$ = −.379 | | $S_5$=.012 | | | |
| F | $R_{10}$=−1.026 | $t_6$=.177 | | 2.209 | 1.617 | 54.9 |
| | $R_{11}$=−.624 | | $S_6$=.260 | | | |
| G | $R_{12}$=−1.884 | $t_7$=.193 | | 2.074 | 1.621 | 36.2 |
| | $R_{13}$=−1.026 | | $S_7$=.272 | | | |
| H | $R_{14}$=+.373 | $t_8$=.091 | | −34.67 | 1.617 | 54.9 |
| | $R_{15}$=+.288 | | | | | |

Scalar quantities in inches.

Although only one specific form of lens system has been shown and described in detail, other forms are possible within the stated limits and changes and substitutions may be made therein without departing from the spirit of the invention as defined in the appended claims.

What is claimed is:

1. An optical system for a microscope or the like having a substantially zero total Petzval sum and zero astigmatism, a numerical aperture of substantially 0.65 and a magnification factor of substantially 40X, said objective comprising a series of successive optically aligned lens elements which are designated by the letters A to H, the A lens being nearest to the object under observation, lens elements A, B and C being positive meniscus singlets, lens elements D and E together forming a negative meniscus doublet, elements F and G being positive meniscus singlets, and lens element H being of negative power, all singlets except the rearmost being concave toward said object, the focal lengths of said elements being designated successively $F_A'$ to $F_H'$, $f$ designating the equivalent focus of said system, the numerical values thereof being given in the table herebelow, $$15.0f < F_A' < 18.0f$$
$$2.8f < F_B' < 3.4f$$
$$2.4f < F_C' < 2.9f$$
$$1.07f < -F_D' < 1.26f$$
$$1.40f < F_E' < 1.7f$$
$$1.0f < F_F' < 1.2f$$
$$.88f < F_G' < 1.06f$$
$$1.5f < -F_H' < 1.8f$$

the range of numerical values of the lens thicknesses which are designated $t_1$ to $t_8$, being given in the table herebelow, $$.53f < t_1 < .65f$$
$$.34f < t_2 < .42f$$
$$.38f < t_3 < .45f$$
$$.20f < t_4 < .25f$$
$$.52f < t_5 < .63f$$
$$.78f < t_6 < .94f$$
$$.85f < t_7 < 1.03f$$
$$.39f < t_8 < .49f$$

the range of numerical values of the lens spacings which are designated $S_1$ to $S_7$, being given in the table herebelow, $$.074f < S_1 < .091f$$
$$.018f < S_2 < .021f$$
$$.018f < S_3 < .021f$$
$$.018f < S_4 < .021f$$
$$.053f < S_5 < .064f$$
$$1.13f < S_6 < 1.39f$$
$$1.19f < S_7 < 1.45f$$

the range of numerical values of the refractive index of the lens materials of the successive elements A to H being given in the table herebelow, $$1.615 < n_D(A) < 1.625$$
$$1.615 < n_D(B) < 1.625$$
$$1.612 < n_D(C) < 1.622$$
$$1.740 < n_D(D) < 1.760$$
$$1.615 < n_D(E) < 1.625$$
$$1.612 < n_D(F) < 1.622$$
$$1.616 < n_D(G) < 1.626$$
$$1.612 < n_D(H) < 1.622$$

the range of numerical values of the Abbe number for the lens materials of the successive elements A to H being given in the table herebelow, $$58.0 < \nu(A) < 62.0$$
$$58.0 < \nu(B) < 62.0$$
$$52.0 < \nu(C) < 57.0$$
$$25.0 < \nu(D) < 30.0$$
$$58.0 < \nu(E) < 62.0$$
$$52.0 < \nu(F) < 57.0$$
$$34.0 < \nu(G) < 38.0$$
$$52.0 < \nu(H) < 57.0$$

2. A microscope objective and the like comprising a plurality of optically aligned lens elements which are designated in order from the front of the objective by letters A to H and collectively form a flat image of an object at 40X magnification, the numerical aperture of the objective being substantially 0.65, the constructional data therefor being given in the mathematical expressions herebelow wherein R and $t$ denote the lens radii and lens thickness respectively, S denotes the lens spacings, $n_D$ and $\nu$ denote respectively the refractive index and Abbe number of the materials from which the lens elements are made, and $f$ denotes the equivalent forcus of said system, $$.35f<-R_1<.43f$$
$$.54f<-R_2<.66f$$
$$1.09f<-R_3<1.32f$$
$$.75f<-R_4<.92f$$
$$11.0f<-R_5<13.5f$$
$$1.36f<-R_6<1.6f$$
$$1.6f<-R_7<1.97f$$
$$1.6f<+R_8<1.97f$$
$$1.6f<-R_9<1.97f$$
$$4.48f<-R_{10}<5.47f$$
$$2.72f<-R_{11}<3.32f$$
$$8.23f<-R_{12}<10.05f$$
$$4.48f<-R_{13}<5.47f$$
$$1.63f<+R_{14}<1.99f$$
$$1.25f<+R_{15}<1.54f$$
$$.53f<t_1<.65f$$
$$.34f<t_2<.42f$$
$$.38f<t_3<.45f$$
$$.20f<t_4<.25f$$
$$.52f<t_5<.63f$$
$$.78f<t_6<.94f$$
$$.85f<t_7<1.03f$$
$$.39f<t_8<.49f$$
$$.074f<S_1<.091f$$
$$.018f<S_2<.021f$$
$$.018f<S_3<.021f$$
$$.018f<S_4<.021f$$
$$.053f<S_5<.064f$$
$$1.13f<S_6<1.39f$$
$$1.19f<S_7<1.45f$$

and wherein $$n_D(A)=n_D(B)=n_D(E)=>1.615$$
$$n_D(C)=n_D(F)=n_D(H)\leq n_D(A)$$
$$n_D(D)=[n_D(A)+\text{at least }.13]$$
$$v(A)=v(B)=v(E)=<61.0$$
$$v(C)=v(F)=v(H)=[v(A)-\text{at least }5.0]$$
$$v(D)=[v(A)-\text{at least }32.0]$$
$$v(G)=[v(A)-\text{at least }24.0]$$

3. An optical system for microscopes and the like as set forth in claim 2, the radii $R_1$ to $R_{15}$ of the refractive surfaces therein being related to each other as substantially specified in the table herebelow, $$-R_2=-1.52R_1$$
$$-R_4=-.69R_3$$
$$-R_6=-.122R_5$$
$$-R_7=-R_9=+R_8$$
$$-R_{11}=-.606R_{10}$$
$$-R_{13}=-.544R_{12}$$
$$+R_{15}=+.77R_{14}$$

4. A microscope objective comprising a plurality of optically aligned lens elements which are designated in order from the front of the objective by letters A to H and cooperatively form an image of an object at 40× magnification, the numerical aperture being substantially 0.65, the constructional data therefor being given in the table herebelow wherein R represents the radius of lens curvature, $t$ represents the thickness of a lens element, S represents the lens spacing, F.L. designates the focal length of an element, $f$ denotes the equivalent focus of the objective, $n_D$ represents the refractive index and $v$ represents the Abbe number of the glass used in constructing said elements,

[E.F.=0.206. N.A.=0.65. Magnification=40×]

| Lens | Radii | Thicknesses | Spaces | F.L. | $n_D$ | $v$ |
|---|---|---|---|---|---|---|
| A | $R_1=-.081$ | $t_1=.122$ | $S_1=.017$ | 3.425 | 1.620 | 60.3 |
|   | $R_2=-.123$ |   |   |   |   |   |
| B | $R_3=-.218$ | $t_2=.079$ | $S_2=.004$ | 0.645 | 1.620 | 60.3 |
|   | $R_4=-.172$ |   |   |   |   |   |
| C | $R_5=-2.530$ | $t_3=.087$ | $S_3=.004$ | 0.564 | 1.617 | 54.9 |
|   | $R_6=-.310$ |   |   |   |   |   |
| D | $R_7=-.379$ | $t_4=.047$ | $S_4=.004$ | −0.246 | 1.751 | 27.8 |
| E | $R_8=+.379$ | $t_5=.118$ |   | 0.325 | 1.620 | 60.3 |
|   | $R_9=-.379$ |   |   |   |   |   |
| F | $R_{10}=-1.026$ | $t_6=.177$ | $S_5=.012$ | 2.209 | 1.617 | 54.9 |
|   | $R_{11}=-.624$ |   |   |   |   |   |
| G | $R_{12}=-1.884$ | $t_7=.193$ | $S_6=.260$ | 2.074 | 1.621 | 36.2 |
|   | $R_{13}=-1.026$ |   |   |   |   |   |
| H | $R_{14}=+.373$ | $t_8=.091$ | $S_7=.272$ | −34.67 | 1.617 | 54.9 |
|   | $R_{15}=+.288$ |   |   |   |   |   |

Scalar quantities in inches.

References Cited in the file of this patent
UNITED STATES PATENTS 2,206,155   Boegehold _____ July 2, 1940
2,644,362   Ravizza et al. _____ July 7, 1953